US008192169B2

(12) United States Patent
Piasecki

(10) Patent No.: US 8,192,169 B2
(45) Date of Patent: Jun. 5, 2012

(54) HIGHLY RELIABLE, LOW COST WIND TURBINE ROTOR BLADE

(76) Inventor: Frederick W Piasecki, Haverford, PA (US)

( * ) Notice: Subject to any disclaimer, the term of this patent is extended or adjusted under 35 U.S.C. 154(b) by 0 days.

(21) Appl. No.: 12/757,832

(22) Filed: Apr. 9, 2010

(65) Prior Publication Data

US 2011/0187115 A1   Aug. 4, 2011

(51) Int. Cl.
*B64C 11/24* (2006.01)
(52) U.S. Cl. ..... 416/226; 416/233; 416/230; 29/889.71; 29/889.72
(58) Field of Classification Search ............... 416/226, 416/229 R, 230, 232, 233, 241 A; 29/889.7, 29/889.71, 889.72; 264/137
See application file for complete search history.

(56) References Cited

U.S. PATENT DOCUMENTS

| | | | |
|---|---|---|---|
| 2,360,791 A | 10/1944 | Palmer | |
| 4,533,297 A | 8/1985 | Bassett | |
| 4,557,666 A | 12/1985 | Baskin | |
| 4,767,939 A | 8/1988 | Calley | |
| 5,295,793 A | 3/1994 | Belden | |
| 5,320,491 A | 6/1994 | Coleman | |
| 5,474,425 A * | 12/1995 | Lawlor | 416/223 R |
| 5,499,904 A * | 3/1996 | Wallace et al. | 416/230 |
| 6,561,459 B2 * | 5/2003 | Amaoka et al. | 244/123.7 |
| 6,972,498 B2 | 12/2005 | Jamieson | |
| 7,546,864 B2 * | 6/2009 | Kaye | 156/467 |
| 8,043,067 B2 * | 10/2011 | Kuroiwa et al. | 416/230 |
| 2004/0042894 A1 | 3/2004 | Smith | |
| 2007/0189903 A1 | 8/2007 | Eyb | |
| 2008/0206062 A1 * | 8/2008 | Sanz Pascual et al. | 416/226 |
| 2009/0022598 A1 | 1/2009 | Enovoldsen | |
| 2009/0068017 A1 * | 3/2009 | Rudling | 416/219 R |
| 2009/0140527 A1 * | 6/2009 | Pawar et al. | 290/55 |
| 2009/0148285 A1 | 6/2009 | Scholte-Wassink | |
| 2010/0068058 A1 | 3/2010 | Sorensen | |
| 2010/0086407 A1 | 4/2010 | Holmoy | |
| 2010/0086409 A1 | 4/2010 | Whiley | |
| 2010/0119373 A1 | 5/2010 | Vronsky | |
| 2010/0143147 A1 | 6/2010 | Akhtar | |
| 2011/0189025 A1 * | 8/2011 | Hancock et al. | 416/226 |

* cited by examiner

*Primary Examiner* — Edward Look
*Assistant Examiner* — Andrew C Knopp
(74) *Attorney, Agent, or Firm* — Robert J. Yarbrough; Lipton, Weinberger & Husick

(57) ABSTRACT

A wind turbine rotor blade and a wind turbine incorporating the rotor blade include a first and second composite skin. A first and a second spar pultrusion having a base and a plurality of integral ribs generally normal to the base are attached to the inside surface of the first and second composite skins and extend the span of the rotor blade. At least one shear web connects a rib of the first spar pultrusion to a corresponding rib of the second spar pultrusion. The width of the spar pultrusions decreases in a step-wise fashion along the span of the rotor blade from the root to the tip. The leading or trailing edge of the rotor blade may be selectably opened for inspection and repair.

20 Claims, 18 Drawing Sheets

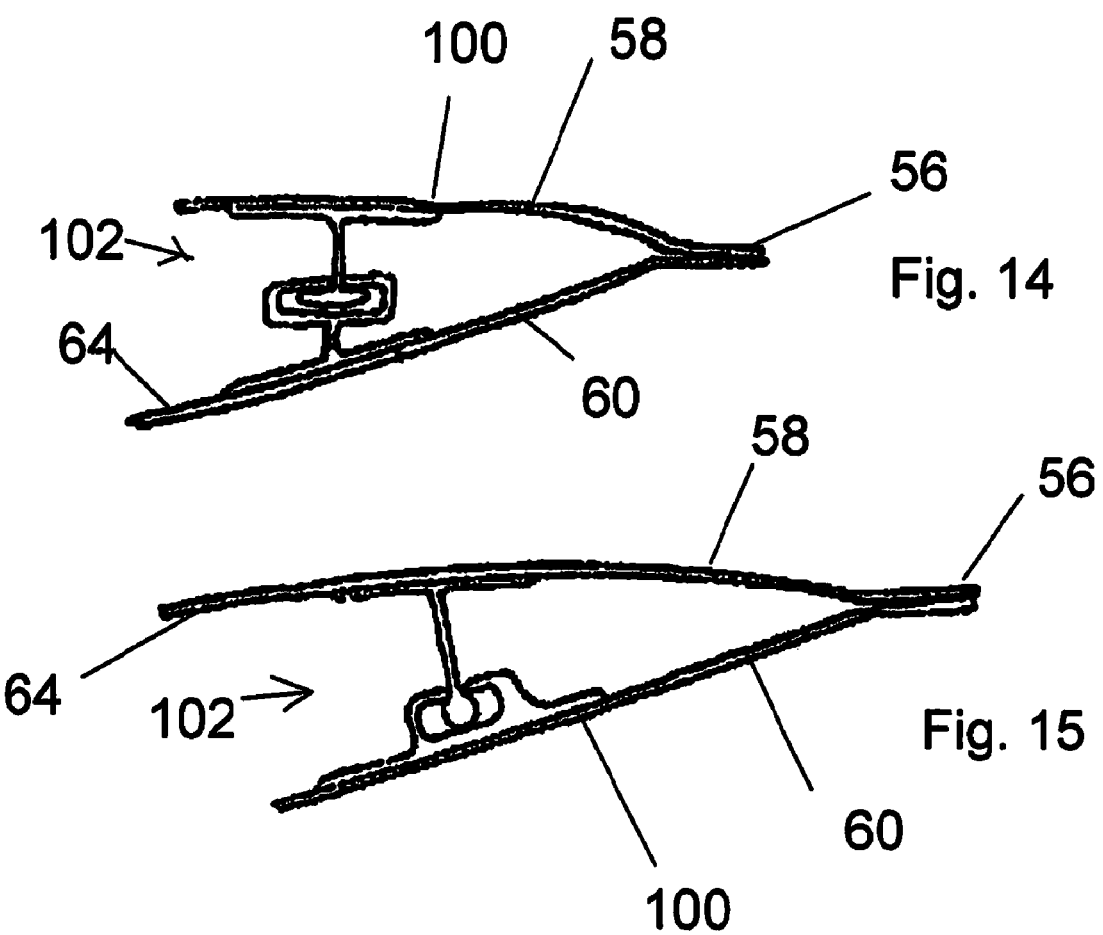

HIGHLY RELIABLE, LOW COST WIND TURBINE ROTOR BLADE

BACKGROUND OF THE INVENTION

1. Field of the Invention

The Invention is a wind turbine rotor blade assembly for generation of power and is a wind turbine featuring the blade. The Invention is also a method of making the wind turbine rotor blade. The wind turbine rotor blade of the invention is highly reliable and inexpensive to manufacture compared to large prior-technology wind turbine rotor blades.

2. Description of the Related Art

Wind turbines harvest the kinetic energy of the wind and convert that energy into shaft power at a rotating output shaft. The rotating output shaft turns an electrical generator to produce electrical power. For wind turbines of the horizontal type, the blades rotate in a plane of rotation that is on the upwind side or downwind side of a supporting tower and about an axis of rotation that is generally horizontal with the Earth. The rotor of a horizontal-type wind turbine for commercial electrical power generation is large, and can be over 400 feet in diameter. The rotor includes one or more rotor blades. Each rotor blade is shaped as an airfoil. The wind passing over the rotating rotor blade generates lift, impelling the rotor blade to rotate about the axis of rotation.

A wind turbine rotor blade is subject to substantial stresses due to the rotational inertia of the rotor and the moments imparted by the wind and by gravity. The moments imparted by the wind and by gravity acting on the rotor blade vary along the span of the rotor blade and vary with each revolution of the rotor. Gusts, variable wind speeds and inclement weather can place a very high steady and alternating loading on the structures of a wind turbine. Wind turbines also are subject to frequent starting and stopping cycles. Failure of current-technology wind turbine rotor blades is a very real problem for the wind power industry.

Fiberglass is the material of choice for wind turbine rotor blades. During the 1970s, many materials for turbine rotor blade construction were tried, including steel, aluminum and wood. Turbine designers recognized degradation from fatigue as the dominant factor in rotor blade material selection. Fiberglass has come to dominate the industry due to its moderate density and general resistance to degradation from fatigue.

When adopting fiberglass some thirty years ago, the wind power industry also adopted the fiberglass construction techniques of the time. Those techniques were developed by the small boat industry, which was marked by low-volume production using individual molds in which days of lay-up using multiple plys of fiberglass were performed by hand and in which the hull or deck of the small boat remained until the resin in the fiberglass was fully cured. The rotor blade industry still uses these same techniques. The vast majority (88%) of wind turbine rotor blades are constructed by the hand lay-up of fiberglass-reinforced resin. Dry glass fibers in the form of cloth or roving are manually placed in forms by workers, who then infuse the dry glass fibers with resin, either with or without the assistance of vacuum.

This non-automated prior art method of rotor blade construction is slow, imprecise, and not conducive of high-volume blade manufacture. Prior art wind turbine rotor blade construction provides many opportunities for introduction of manufacturing defects, such as improper reduction in the number of the plys of glass fiber along the span of the blade or introduction of foreign object debris. Prior art wind turbine rotor blade manufacture does not allow monitoring and correction of minor defects in internal blade components before those defects cause major blade failures. The prior art method of blade manufacture also requires large and expensive tooling and highly skilled labor.

Prior art turbine rotor blades feature an upper and a lower side that are formed in molds. Upper and lower spar caps are bonded to the upper and lower sides and are joined by shear webs that extend the length of the blade to provide bending stiffness along the length of the blade and to maintain the cross-sectional profile of the blade. When the upper and lower sides of the prior art rotor blade are joined one to the other, the leading and trailing edges are permanently joined.

The prior art joints between the upper and lower spar caps and the upper and lower sides and between the spar caps and the shear web cannot be inspected once the upper and lower sides are bonded, preventing detection of defects. A local defect, such as a void or defect in a bond for the shear web, can propagate along the length of the rotor blade during operation of the rotor blade, causing catastrophic failure. The local defect generally will translate into a rotor blade failure triggered by a precipitating event, such as erosion, a lightning strike, a blade overload or a tower strike.

The Piasecki Aircraft Corporation ('PiAC') conducted a root cause analysis of numerous rotor blade failures. The root cause analysis concluded that factory processes and controls in the manufacturing environment of the prior art wind turbine rotor blades caused many of the failures. Other failures were caused by design shortcomings of the prior art rotor blades. Among the manufacturing defects found in the root cause analysis were dry fiber, misaligned fiber layup, core voids and deficient ply build-up in transition sections.

The prior art does not teach the wind turbine, the wind turbine rotor blade, or the method of the Invention.

BRIEF DESCRIPTION OF THE INVENTION

The wind turbine rotor blade of the Invention is constructed to allow lighter weight, lower cost, inspectable joints and more rapid and dependable construction than prior technology wind turbine rotor blades. The rotor blade of the Invention has a two-part or a three-part skin. For both the two and three-part rotor blades, opposing first and second composite skins are preformed in molds with multiple structural forms for later assembly. The opposing first and second composite skins may be resin reinforced with glass or carbon fibers. For the three-part rotor blade, a leading edge skin is rolled from stainless steel.

Each skin is formed separately from the spar that reacts the primary bending loads acting on the wind turbine rotor blade. The spar extends the span, or length, of the rotor blade from the rotor blade root to the rotor blade tip. The rotor blade root is the end of the rotor blade that attaches to the hub of the wind turbine. The rotor blade tip is the free end of the rotor blade. The spar is disposed within the skins and reinforces the rotor blade so that the rotor blade maintains its cross-sectional shape. The spar also provides stiffness along the span of the rotor blade normal to the plane of rotation to resist bending of the rotor blade in response to the wind loads.

The spar features a pair of elongated spar pultrusions. Each spar pultrusion has a spar pultrusion base and a plurality of ribs normal to the spar pultrusion base. The spar pultrusion base of one of the pultrusions is bonded to one of the opposing faces of the first and second composite skins and the other spar pultrusion base is bonded to the other of the opposing faces. The spar pultrusions (and the ribs forming part of those spar pultrusions) extend from the rotor blade root to the rotor blade tip.

The process of 'pultrusion' is a continuous manufacturing process for creating composite parts having a constant cross-section and any desired length. Reinforcing fibers such as fibers of glass or carbon are fully saturated ("wetted-out") with a thermosetting resin, usually unsaturated polyester or a vinyl ester. The wetted-out fibers are compacted to eliminate excess resin and pulled through a heated die. Heat from the die cures the resin while the composite is still fully laminated and held in the desired shape by the die. The pultruded part is fully hardened by the time that the part leaves the die. The part can be immediately inspected for voids or other defects using automated systems and defective sections immediately discarded. The term 'pultrusion' as used in this document includes a part made by the pultrusion process.

Because the rotor blade has a smaller chord (width) at the rotor blade tip than at the rotor blade root, and because the spar experiences smaller flexural (bending) moments toward the tip than toward the root, the degree of reinforcement provided by the full width of the spar pultrusion is not required or desirable for the full span of the rotor blade. Prior to assembly into the rotor blade, the spar pultrusion is cut as described below. As used in this document, the term "cut" as applied to the spar pultrusion means cut using a water jet, cut using a saw, cut using a platen-type "C" head water jet cutting machine, cut using a milling machine or cut using any other apparatus or technique known in the art.

The cutting of the spar pultrusion reduces the width of the spar pultrusion base, and hence the number of elongated ribs, in a stepwise fashion from the rotor blade root to the rotor blade tip. The cutting of the spar pultrusion also can reduce the depth of each of the remaining elongated ribs toward the rotor blade tip, so that the depth of the reinforcing rib is greater toward the rotor blade root and lesser toward the rotor blade tip. The cutting of the spar pultrusion can reduce the thickness of the spar pultrusion base and the thickness of the ribs so that the thickness of the base and the thickness of the ribs is greater toward the blade root and lesser toward the blade tip. The cutting of the spar pultrusion corresponds the local strength and stiffness of the spar, and hence the strength and stiffness of the rotor blade, to the loads that will be placed on the rotor blade locally.

The number of elongated ribs, the rib depth, and the other structural elements of the rotor blade are selected to be the minimum that will carry the expected loads with an adequate factor of safety, thereby minimizing the weight of the rotor blade.

The spar also includes a series of shear webs locally joining a one of the spar pultrusion ribs attached to the first skin to a corresponding spar pultrusion rib attached to the second skin. The shear web is a composite structure with opposing shear web skins on either side of a shear web core. The shear web skins are strong and stiff compared with the core. For example, the shear web skins may be glass fiber-reinforced resin and the shear web core may be composed of foam, balsa wood or paper. The location and dimensions of the shear web at each location along the rotor blade are selected to accommodate the local stresses that are expected to occur at that location. If the expected local stresses at a location require additional longitudinal stiffness or resistance to twisting, two or more shear webs may join two or more pairs of ribs at the location.

The number, dimensions and locations of the shear web(s) and ribs at each location along the span of the rotor blade may be selected to control the local torsional stiffness (resistance to twisting of the rotor blade in response to a load) of the rotor blade at each location along the span of the rotor blade as well as the strength and flexural stiffness (resistance to longitudinal bending of the rotor blade in response to a load) of the rotor blade at each location along the span of the rotor blade. Selecting the local torsional stiffness of the rotor blade allows the rotor blade to be designed to twist by a predetermined amount in response to a given local wind loading at each location along the span of the rotor blade. The predetermined amount of twist in response to a given local wind load may be selected to adjust dynamically the local angle of attack of the rotating rotor blade at each location along the span of the rotor blade. For example, the local torsional stiffness may be selected so that under conditions of high wind, the rotor blade twists to reduce the angle of attack of the rotor blade, shedding a portion of the wind load on the rotor blade and avoiding overloading the rotor blade.

Each shear web has a first and a second edge. Each of the first and second edge is bonded to an elongated fastening member generally having an 'H' shape in cross section. One side of the 'H' is configured to engage a rib. The other side of the 'H' is configured to engage the shear web. The elongated fastening member is constructed using pultrusion techniques. The elongated fastening member is connected to the appropriate rib by bonding and also by use of pin members, which are mechanical fasteners, attaching the elongated fastening member to the rib through holes defined by the elongated fastening member and the rib. The term 'pin members also includes bolts, screws, rivets or other conventional fasteners that pass through corresponding holes to join two objects together. Pin members may be composed of any suitable material, such as a composite or a metal.

To construct the rotor blade of the Invention having a three-part skin, two opposing composite skins are constructed in molds and a leading edge skin is formed by rolling stainless steel sheet. The embodiment of the invention having a two-part skin dispenses with the separate leading edge skin.

Two or more pultrusions having a spar pultrusion base and ribs normal to the spar pultrusion base are created and checked for defects during the conventional pultrusion process. The pultrusions are cut to reduce the width of the spar pultrusion base and hence the number of ribs in a stepwise fashion to correspond to the dimensions of the rotor blade and the local stresses that will be supported by the rotor blade. The cutting also trims the depth of the ribs for the portion of the pultrusion corresponding to the tip of the rotor blade for the same purpose.

The bases of the spar pultrusions are bonded to the opposing portions of the s inside of the composite skins that will define the leading edge portions of the rotor blade. The bond between the spar pultrusions and the skins are inspected for defects, dry zones and voids. The ribs to be joined together are placed in their design proximity. The plurality of shear webs is installed, joining the corresponding ribs by both bonding using a bonding agent, such as epoxy resin, and by pin members installed through holes. The pin members act to apply pressure to the bond line between the pultrusion connector members and the ribs during manufacture to achieve improved bonding. The pin members also serve as a redundant load transfer mechanism and as a rip-stop to prevent complete failure of the pultrusion connector-rib connection in the event of failure of the bond.

The combination of the shear web(s) and the spar pultrusions defines the spar. The spar, in combination with the skins, defines the torsional and flexural stiffness of the turbine rotor blade. The bonds between the shear webs and the ribs are inspected for voids and defects. For the three skin embodiment, the leading edge skin is joined to both the first and second composite skins by hinge latches. For the two-skin embodiment, the leading edge of the first skin is connected directly to the leading edge of the second skin by hinge latches. The trailing edges of the skins are joined one to the other using conventional mechanical locks, completing the rotor blade.

Use of one or more pultrusions each having a plurality of ribs provides a readily controllable strength and stiffness of the leading portion of the turbine rotor blade and allows the reinforcements to be constructed with strict quality control and without voids or defects. Cutting of the pultrusions allows the strength and stiffness to be tailored to the design requirements of the rotor blade and allows the shear web, and hence the spar, to be located in an optimal location with respect to the opposing skins.

The use of multiple pin members as mechanical fasteners in addition to bonding provides for a secondary load path and a rip-stop in case a bond connection between the shear web and the rib should fail. Failure of a current technology bond connection between a shear web and the current technology end caps attached to the skins can result in a catastrophic failure of the rotor blade.

The bond attachments of current technology wind turbine rotor blades cannot be inspected because those bonds are formed as the skins of the rotor blade are joined to form the finished rotor blade. The Invention allows superior opportunity for quality control during manufacture of the rotor blade components and allows full inspection of every step of the rotor blade assembly process. The bond between the pultrusion and the skins may be inspected prior to the closure of the two rotor blade skins. The attachment of the shear web to the ribs also may be inspected prior to closure of the rotor blade. The Invention allows defects to be found during the assembly process, rather than upon failure of a rotor blade in service. The leading edge hinge latches and the trailing edge mechanical locks form releasable attachments, so that the leading edge skin may be removed and the trailing edge may be opened for inspection and repair of the completed rotor blade.

In one design, the rotor blade and the spar pultrusions, including the spar pultrusion bases and the ribs, are each 125 feet in length. The rotor blade features a linear tapered plan form with straight leading and trailing edges. The rotor blade has a rotor blade root having a chord of 15 feet while the rotor blade chord at the tip is 5.6 feet. The rotor blade has a twist of 14° and is non-linear along the span of the rotor blade. The design rotational speed of the rotor blade is 11.5 rpm and the cut-off wind speed is 22 meters/second.

Two rotor blades are supported by opposing ends of an elongated hub beam that is supported by a teetering hinge. The combination of the rotor blades and hub beam defines a rotor. The rotor rotates about the axis of rotation. The rotor drives a low-speed shaft that powers a speed increaser. The speed increaser is a gear train that steps up the rotational speed and is connected to an electrical generator. The electrical generator produces electrical power. The rotor, teetering hinge, low speed shaft, speed increaser and electrical generator all are housed in a nacelle supported by the tower. The electrical power produced by the electrical generator flows through slip rings to an electrical load. The electrical generator may be attached to an electrical grid and the electrical load may be a load attached to the grid.

BRIEF DESCRIPTION OF THE DRAWINGS

FIG. 14 is a detail cross sections of a trailing edge mechanical lock.

FIG. 15 is a detail cross section of a second trailing edge mechanical lock.

DESCRIPTION OF AN EMBODIMENT

Figure 1:
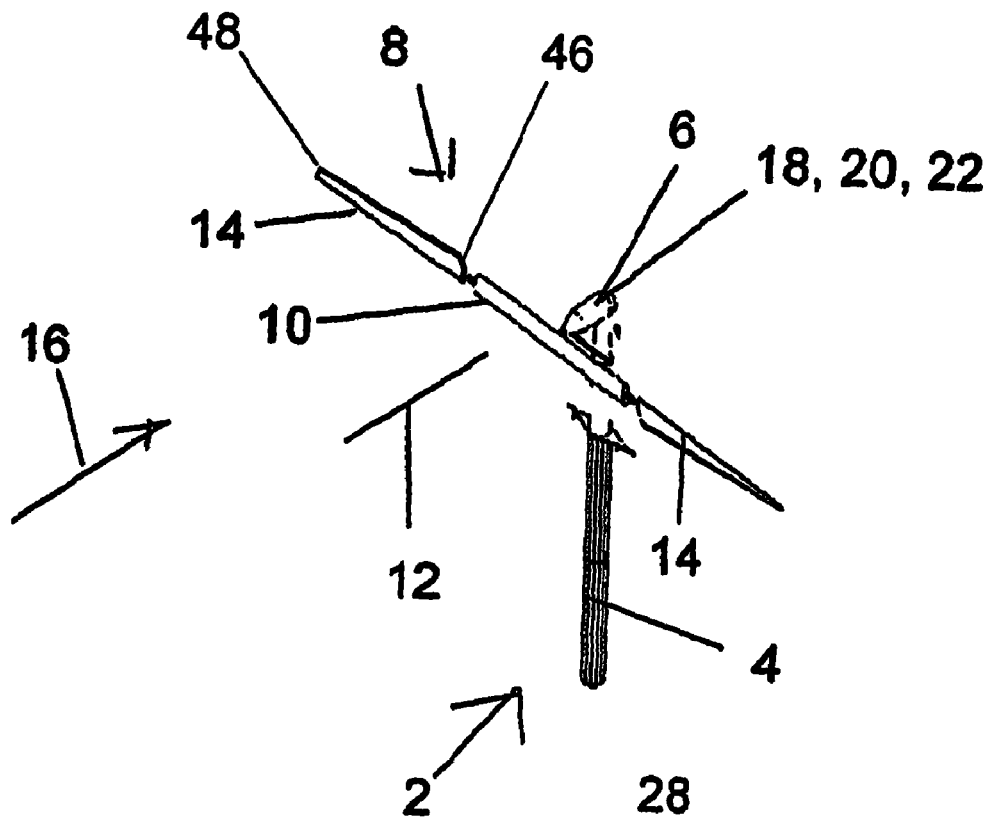
FIG. 1 is a perspective view of the wind turbine of the Invention.

As shown by FIG. 1, the wind turbine 2 of the Invention features a tower 4 and a nacelle 6 supported by the tower 4. The nacelle supports a rotor 8. The rotor 8 comprises a hub beam 10 that rotates about an axis or rotation 12. The rotor 8 also includes two rotor blades 14 attached to opposing ends of the hub beam 10. The rotor blades 14 are in the shape of an airfoil and rotate about axis of rotation 12 in response to wind 16 flowing past the rotor blades 14. The nacelle 6 contains a low speed shaft 18 that is turned by the rotating rotor 8, a speed increaser 20 that is turned by the low speed shaft 18, and an electrical generator 22 that is turned by the speed increaser 20. Electrical generator 22 has an output that feeds electricity to an electrical load 24. The electrical generator 22 can be connected to an electrical power distribution grid 26 and the electrical load 24 can be a load 24 on the distribution grid 26. Tower 4 supports nacelle 6 above ground 28.

FIGS. 2 through 5 illustrate the first and second spar pultrusion 30, 32 of the Invention. A spar pultrusion 30, 32 is a fiber-reinforced resin composite structure manufactured by pulling spar pultrusion fibers that are wetted-out with a spar pultrusion thermosetting resin through a heated die having the profile of the cross section of the desired spar pultrusion 30, 32. The heat from the die cures the spar pultrusion thermosetting resin, resulting in a part that is hard as soon as the part leaves the die. Pultrusions, including the spar pultrusions 30, 32 can be made of any length. Spar pultrusions 30, 32 are inspected using conventional automated methods as they exit the die and parts that have voids or other defects are immediately rejected.

Figure 2:
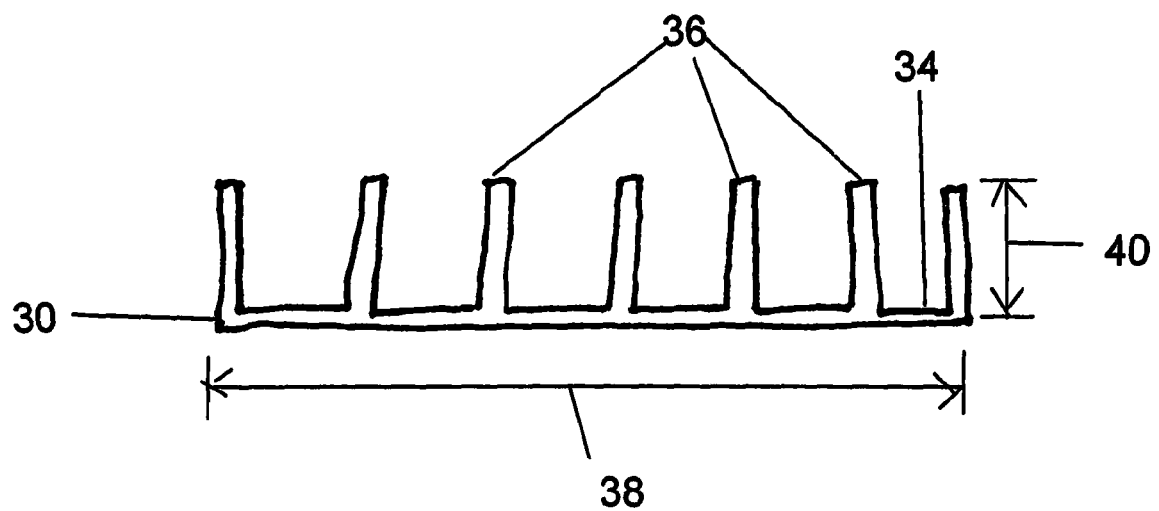
FIG. 2 is a cross section of the spar pultrusion prior to cutting.

FIG. 2 shows the cross section of the spar pultrusion 30, 32 as it is pulled from the die. The first and second spar pultrusions 30, 32 feature a spar pultrusion base 34 and a plurality of elongated ribs 36. The plurality of elongated ribs are oriented generally normal to the spar pultrusion base 34. The spar pultrusion base 34 has a width 38 and each of the ribs has a depth 40.

Figure 3:
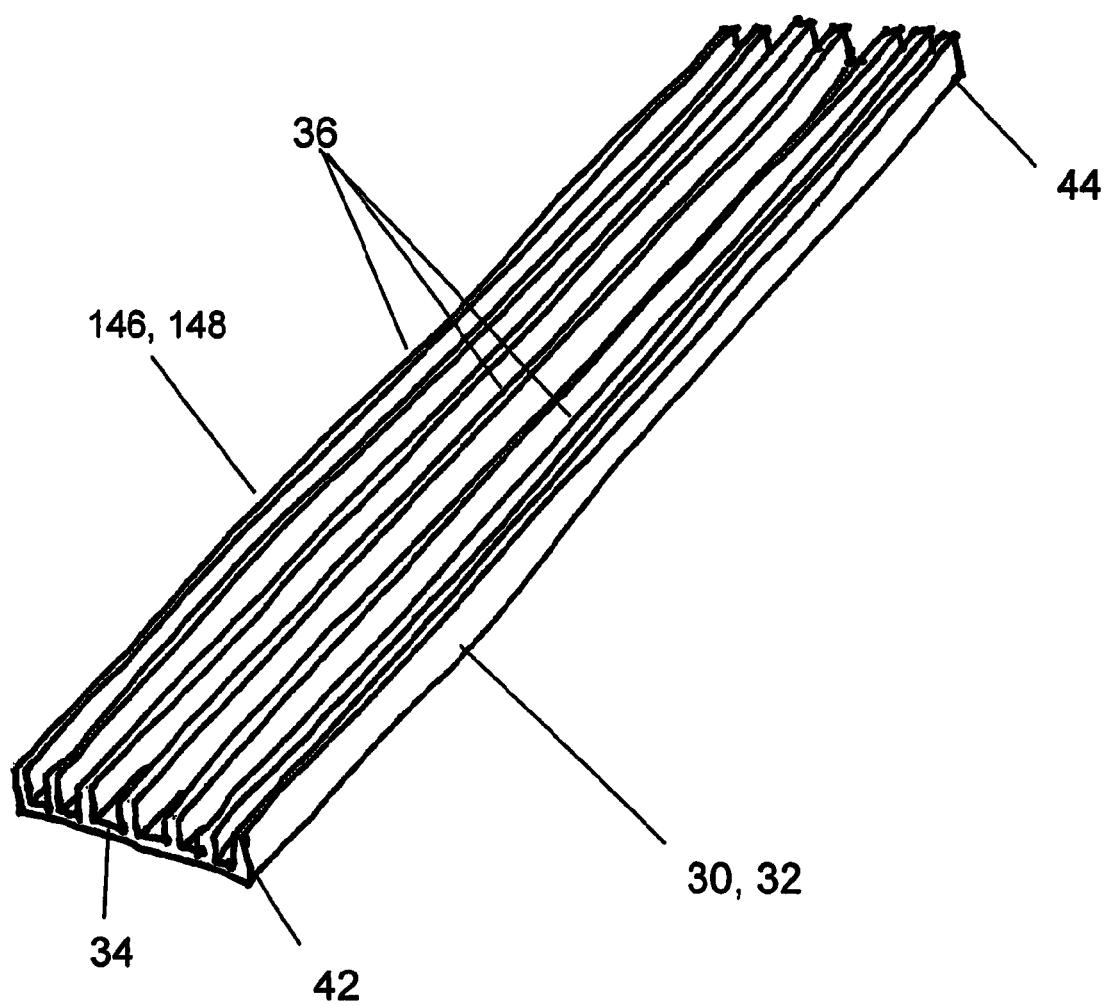
FIG. 3 is a perspective of the spar pultrusion prior to cutting.

FIG. 3 is a detail perspective view of a portion of the spar pultrusion 30, 32 prior to the cutting of the spar pultrusion 30, 32 as described below. The spar pultrusion has a spar pultrusion root end 42 and a spar pultrusion tip end 44. As the spar pultrusion 30, 32 leaves the die, the spar pultrusion 30, 32 has a constant cross section, as illustrated by FIG. 3.

Figure 4:
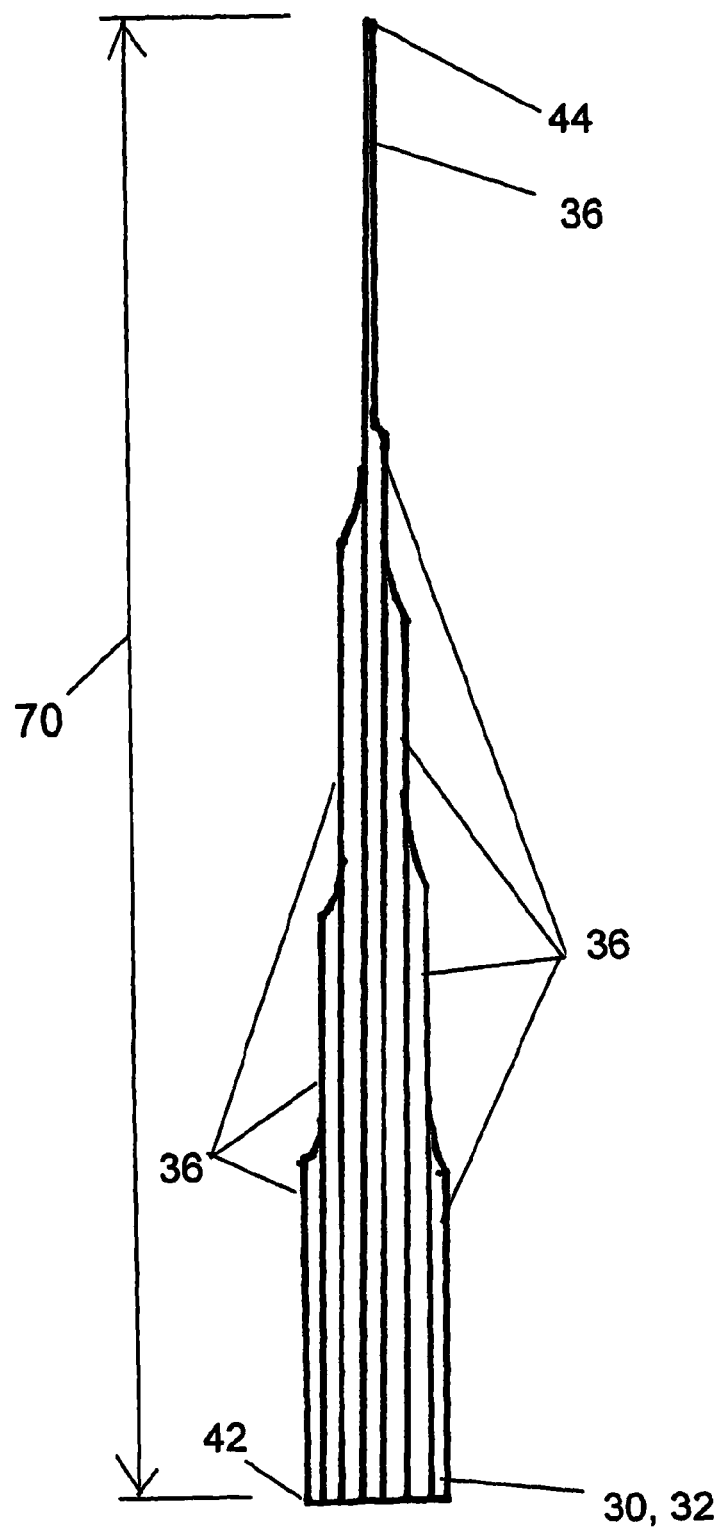
FIG. 4 is a plan view of the spar pultrusion after cutting showing the stepwise reduction in width.

FIG. 4 shows the spar pultrusions 30, 32 after cutting and prior to assembly into the rotor blade 14. Prior to assembly into the rotor blade 14, the spar pultrusion 30, 32 is cut using a platen-type "C" head water jet cutting machine so that the width 38 of the spar pultrusion base 34, and hence the number of elongated ribs 36, is reduced in a stepwise fashion from the root end 42 to the tip end 44. The stepwise decrease in width 38 and hence in the number of ribs 36 is illustrated by FIG. 4. The depth 40 of each of the elongated ribs 36 also is reduced toward the tip end 44, so that the depth 40 of an elongated rib 36 is greater toward the root end 42 and lesser toward the tip end 44. For each location along the length of the spar pultrusion 30, 32, the number of ribs 36, the thickness of ribs 36, thickness of spar pultrusion base 34, width 38 and depth 40 are selected to correspond to the forces, particularly bending forces, that the rotor blade 14 is designed to withstand.

Figure 5:
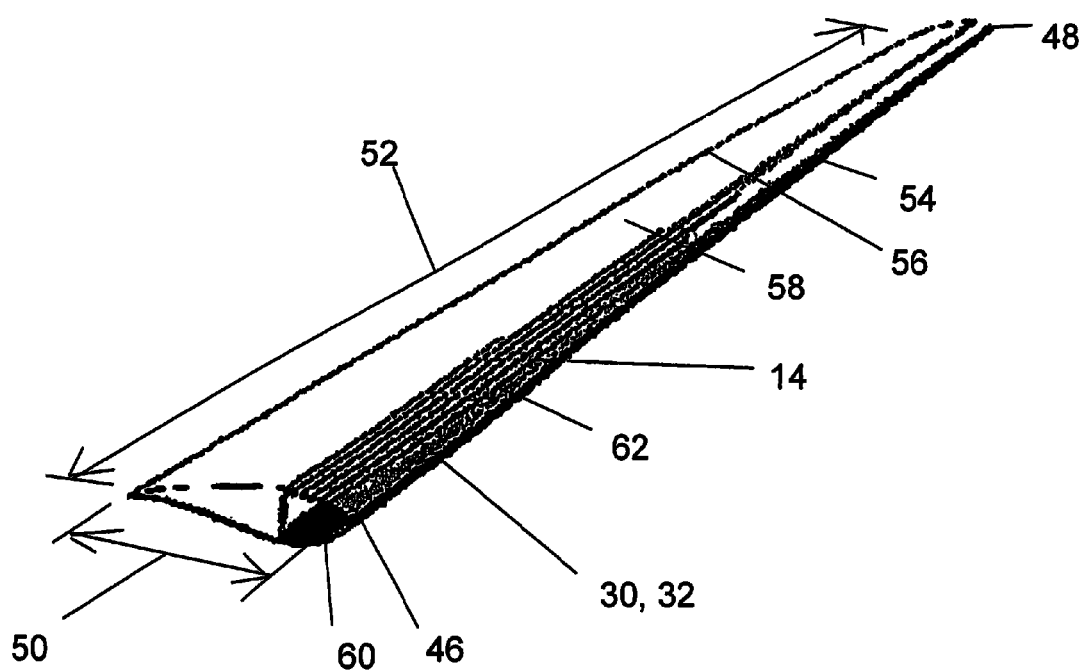
FIG. 5 is a perspective view of the rotor blade of the invention.

FIG. 5 is a partial cutaway perspective view of the airfoil 14 showing one of the spar pultrusions 30, 32. Rotor blade 14 has a rotor blade root 46, a rotor blade tip 48, a chord 50, a span 52, a leading edge 54 and a trailing edge 56. As shown by FIG. 1, rotor blade root 46 is attached to hub beam 10. Spar pultrusions 30, 32 extend the span 52 of the rotor blade 14 from the rotor blade root 46 to the rotor blade tip 48, with spar pultrusion root end 42 corresponding to the rotor blade root 46 and the spar pultrusion tip 44 end corresponding to the rotor blade tip 48. The rotor blade 14 comprises a first composite skin 58, a second composite skin 60 and a leading edge skin 62.

Figure 6:
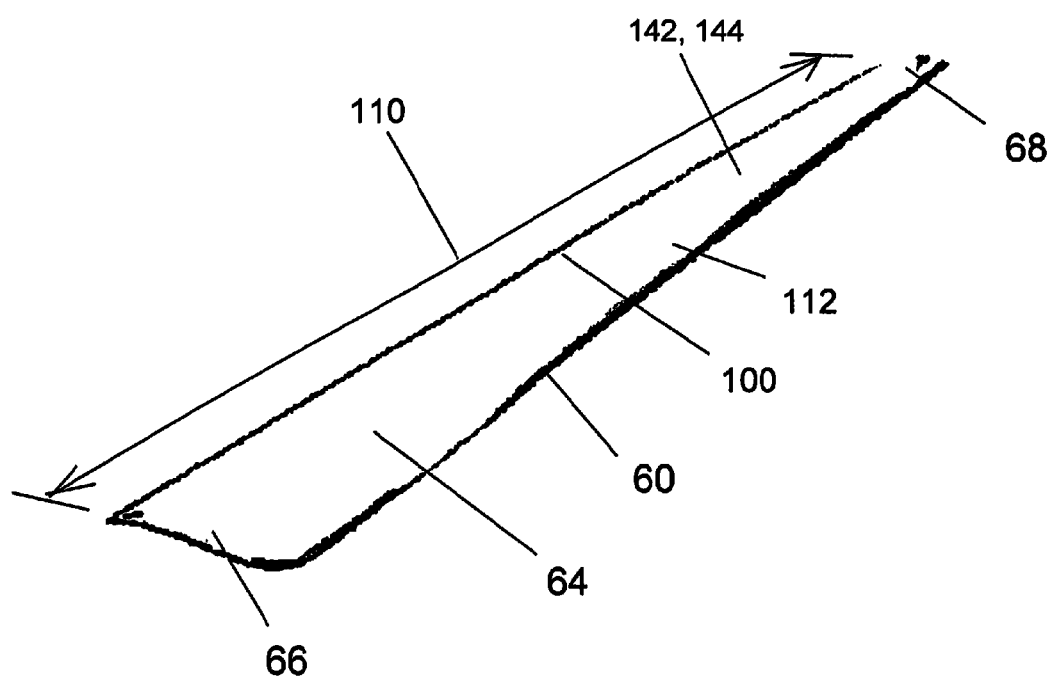
FIG. 6 is a perspective view of the first or second skin.

FIG. 6 is a perspective view of second composite skin 60. First composite skin 58 is similar. First and second composite skins 58 and 60 are constructed separately and each is constructed as a single unit. To construct first and second composite skins 58, 60, skin reinforcing fibers comprising dry glass fibers are assembled using conventional automated machinery similar to the automated construction of fabric for the clothing industry. The dry fiberglass fibers are not laid-up by hand. The quantity and orientation of fibers in the assembled dry glass fibers are selected to achieve the design strength selected for the skin 58, 60 at each location on the skin 58, 60. The first and second skins 58, 60 provide a substantial portion of the strength of the finished rotor blade 14 in torsion, and a substantial portion of the glass fibers are oriented for torsional strength. Assembled dry glass fiber is placed in molds along with reinforcing foam, end-grain balsa wood or other suitable materials and vacuum-infused with skin resin using conventional techniques. The cured skins 58, 60 are removed from the molds and trimmed using automated equipment. Composite skins 58, 60 each has an inside surface 64, a composite skin root end 66 and a composite skin tip end 68. Composite skin root end 66 of first and second composite skins 58, 60 define the rotor blade root 46. Composite skin tip end 68 of first and second composite skins 58, 60 define the rotor blade tip 48.

Figure 7:
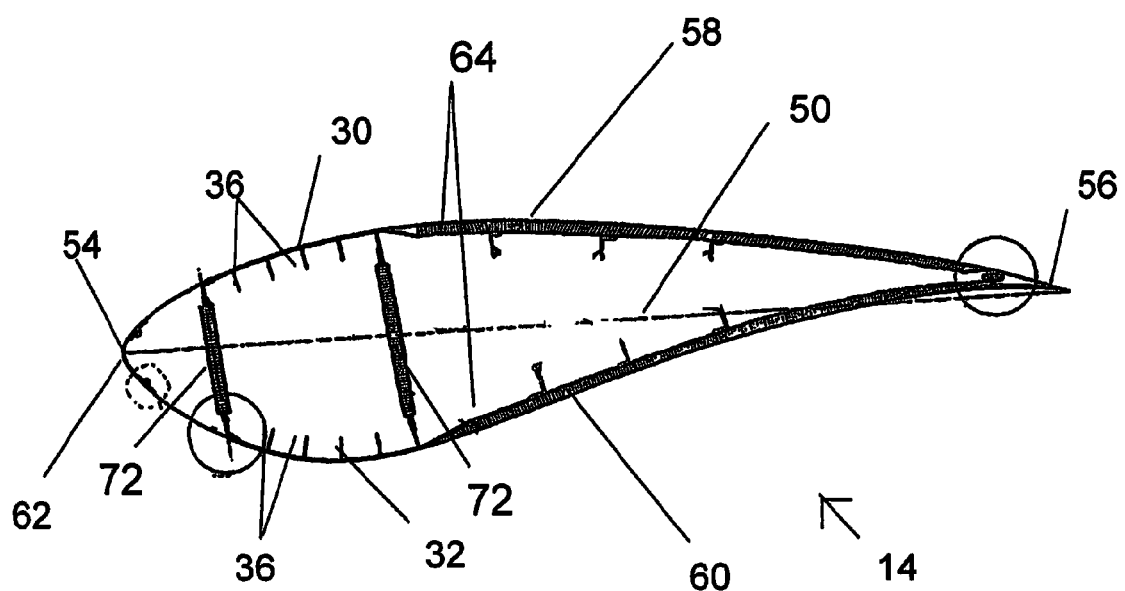
FIG. 7 is a cross section of the rotor blade at the rotor blade root.

FIGS. 7 through 10 are rotor blade 14 cross sections at different locations along span 52 of rotor blade 14. FIG. 7 is a cross section of rotor blade 14 at the rotor blade root 46. The spar pultrusion base 34 of first spar pultrusion 30 is bonded to the inside surface 64 of first composite skin 58. The spar pultrusion base 34 of second spar pultrusion 32 is bonded to the inside surface 64 of the second composite skin 58. Both first and second spar pultrusions 30, 32 are located near the leading edge 54 of rotor blade 14. First and second spar pultrusions 30, 32 each has an elongated dimension 70 (FIG. 4) that is oriented in the direction of the span 52 of the rotor blade 14. Ribs 36 also are oriented in the direction of span 52. Spar pultrusion base 34 provides a large bonding area with the inside surfaces 64 of first and second composite skins 58, 60 to resist failure of the attachments between spar pultrusion bases 34 and inside surfaces 64.

At least one shear web 72 connects one rib 36 of first spar pultrusion 30 to a corresponding rib 36 of second spar pultrusion 32. Shear web 72 in combination with ribs 36 provides stiffness to rotor blade 14 to resist bending of rotor blade 14 normal to the plane of rotation due to the force of the wind 16. FIG. 7 shows a second shear web 72 connecting another rib 36 of the first spar pultrusion 30 to a corresponding rib 36 of the second spar pultrusion 32. The combination of the shear webs 72 and the first and second spar pultrusions 30, 32 define a spar.

Because the number of ribs 36 is reduced in a step-wise fashion from the rotor blade root 46 to the rotor blade tip 48, the shear webs 72 generally are not continuous from the rotor blade root 46 to the rotor blade tip 48. While a shear web 72 may be continuous for the span 52 of the rotor blade 14, a plurality of shear webs 72 that are shorter than the span 52 attach the most appropriate corresponding ribs 36 at each location along the span 52.

Figure 8:
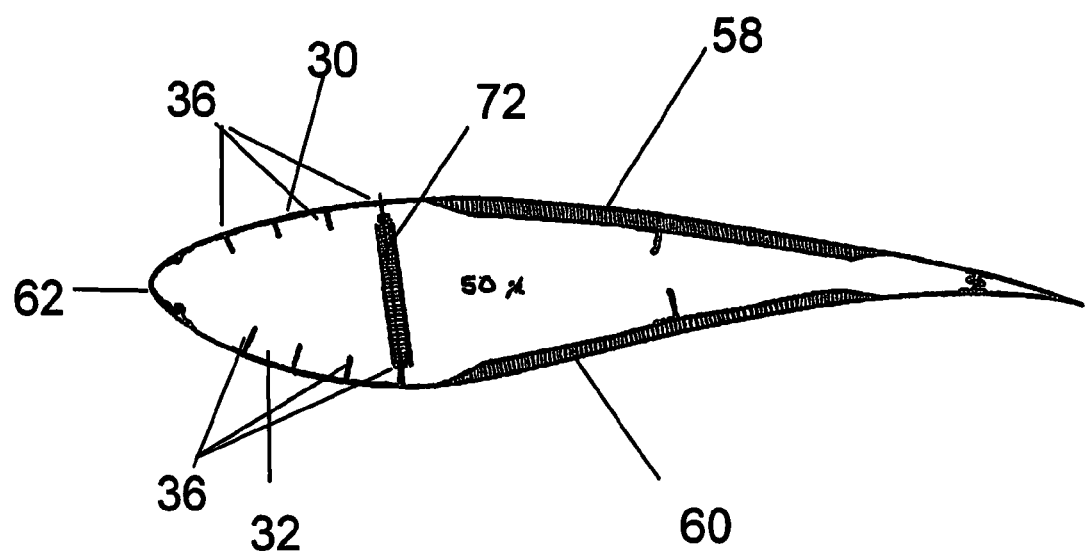
FIG. 8 is a cross section of the rotor blade at 50% of the span of the rotor blade.
Figure 9:
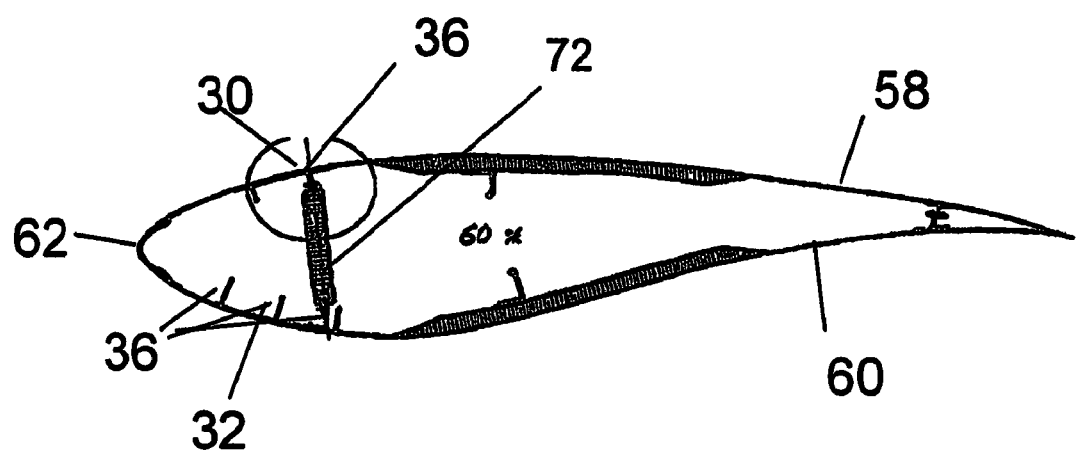
FIG. 9 is a cross section of the rotor blade at 60% of the span of the rotor blade.
Figure 10:
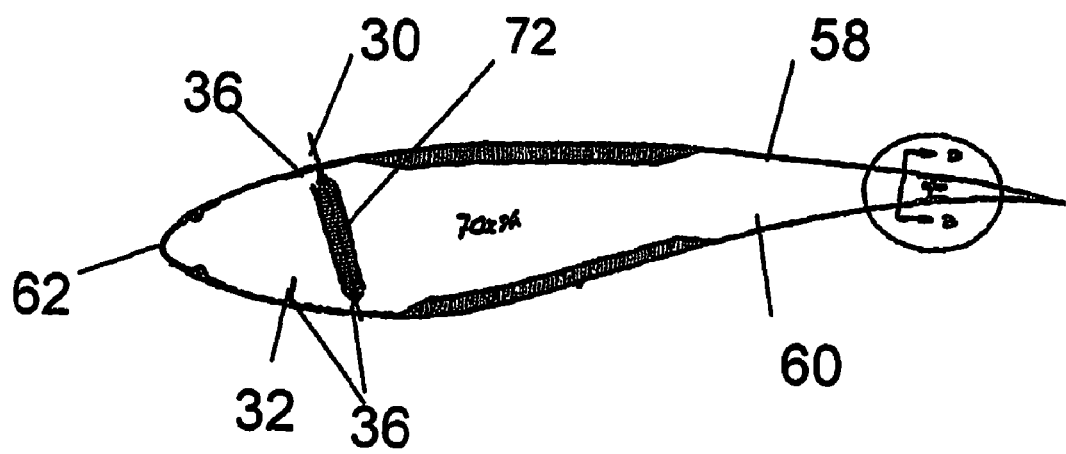
FIG. 10 is a cross section of the rotor blade at 70% of the span of the rotor blade.

FIGS. 8, 9 and 10 are cross sections of the rotor blade 14 at 50%, 60% and 70% along the span 52 of the rotor blade 14, respectively. Each shows first and second composite skins 58, 60. Each shows first and second spar pultrusions 30, 32 joined to inside surfaces 64 of first and second composite skins 58, 60.

As shown by FIGS. 7-10, the rib 36 count reduces with increasing radius along the span 52 due to the step-wise reduction in width 38 of spar pultrusions 30, 32. For this embodiment, at the rotor blade root 46 shown by FIG. 7, a total of six ribs 36 are provided on each of the first and second spar pultrusions 30, 32 to give adequate stiffness. As shown by FIG. 8, by 50% of the span 52, the number of ribs 36 is reduced to four on each of the first and second spar pultrusions 30, 32 to give adequate stiffness. As shown by FIG. 9, at 60% of the span 52, two ribs 36 are provided on first span pultrusion 30 and three ribs 36 are provided on second span pultrusion 32. As shown by FIG. 10, at 70% of the span 52, one rib 36 is provided on first span pultrusion 30 and two ribs 36 are provided on second span pultrusion 32. The number, location and depth 40 of ribs 36 are selected to provide the stiffness required.

As shown by FIGS. 7-10, a thickness and fiber orientation is selected for first and second spar pultrusion base 34 to allow base 34 to conform to the curved inside surfaces 64 of skins 58, 60.

Figure 11:
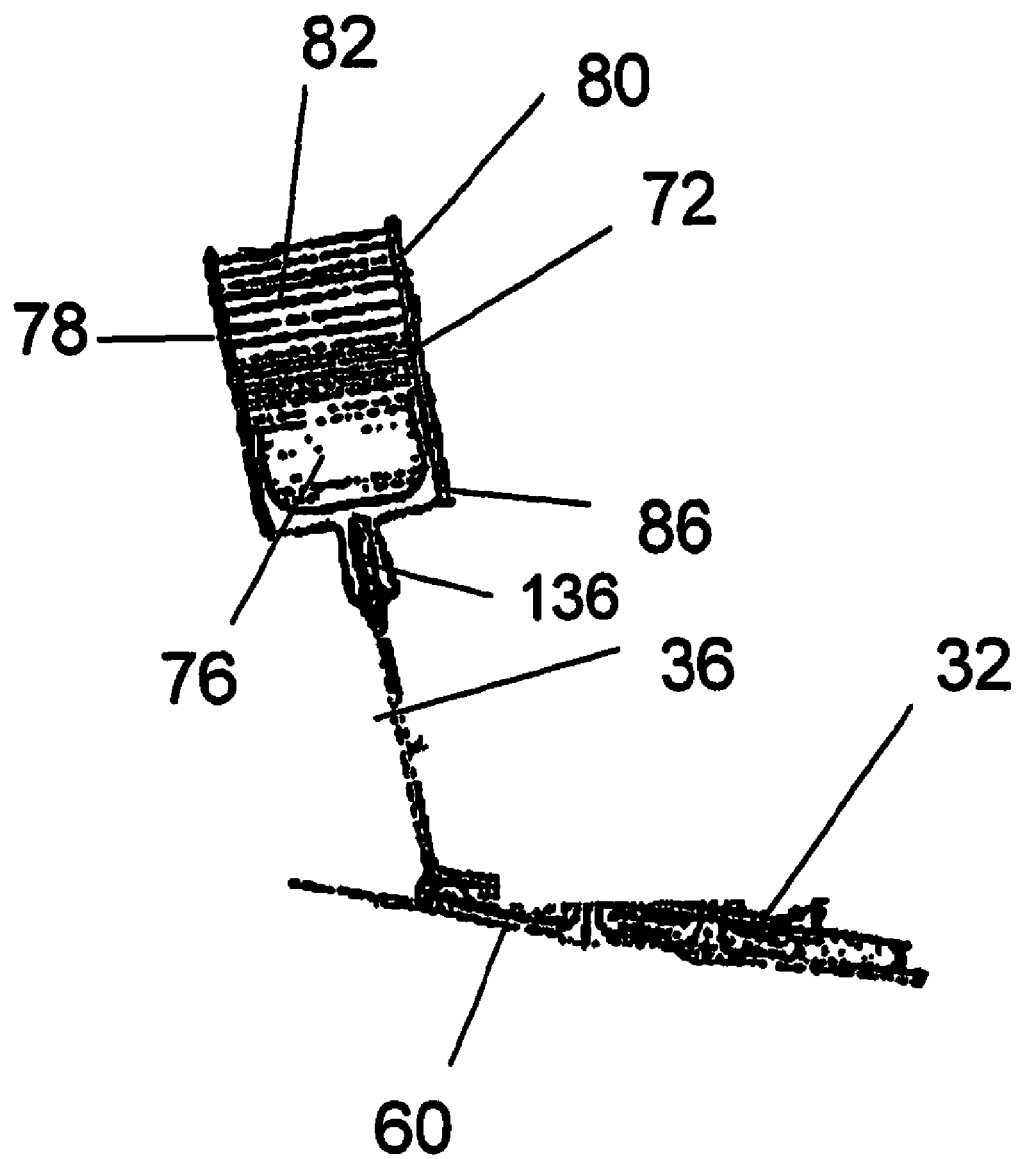
FIG. 11 is a detail cross section of the shear web.
Figure 12:
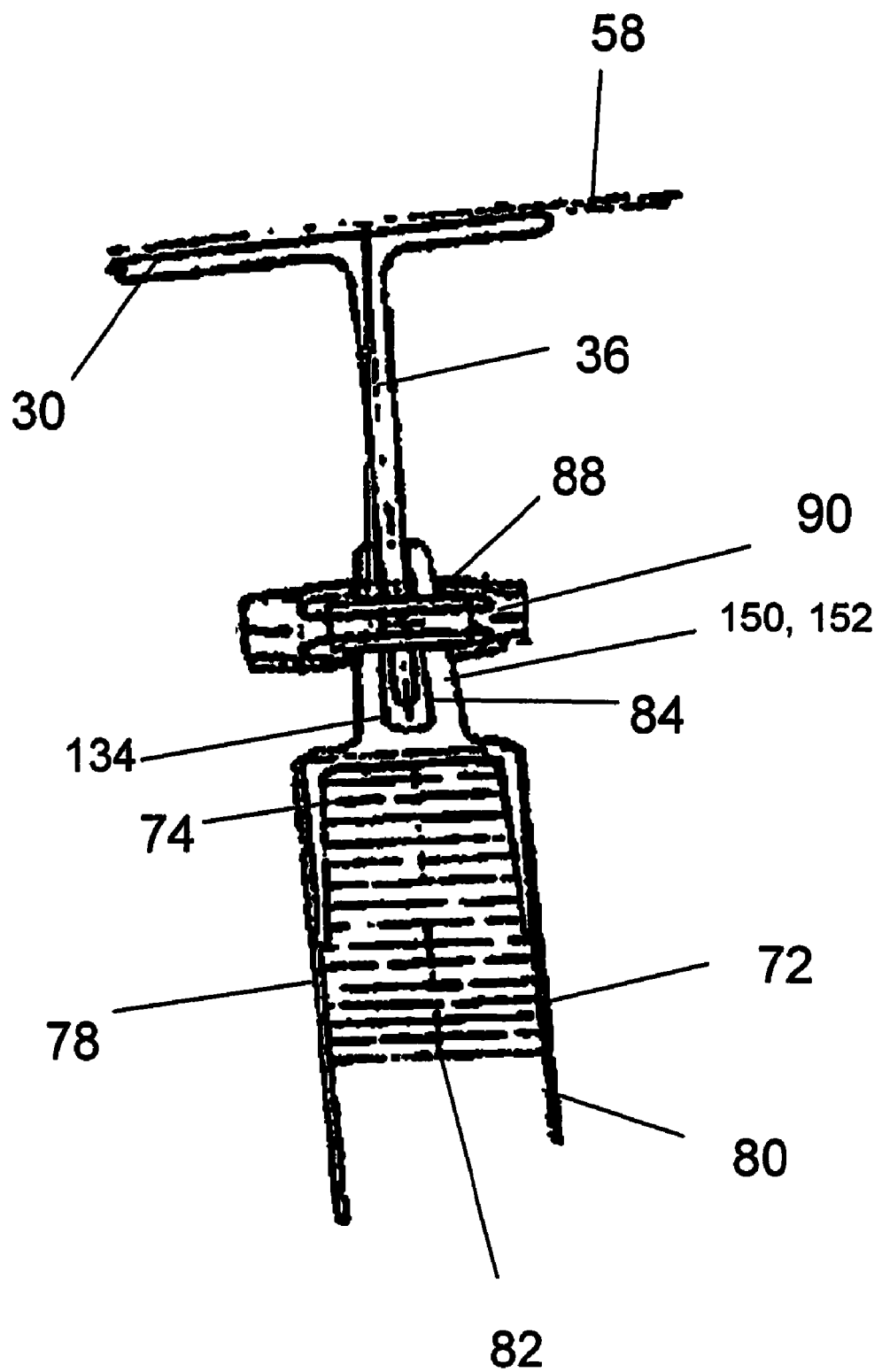
FIG. 12 is a second detail cross section of the shear web.
Figure 13:
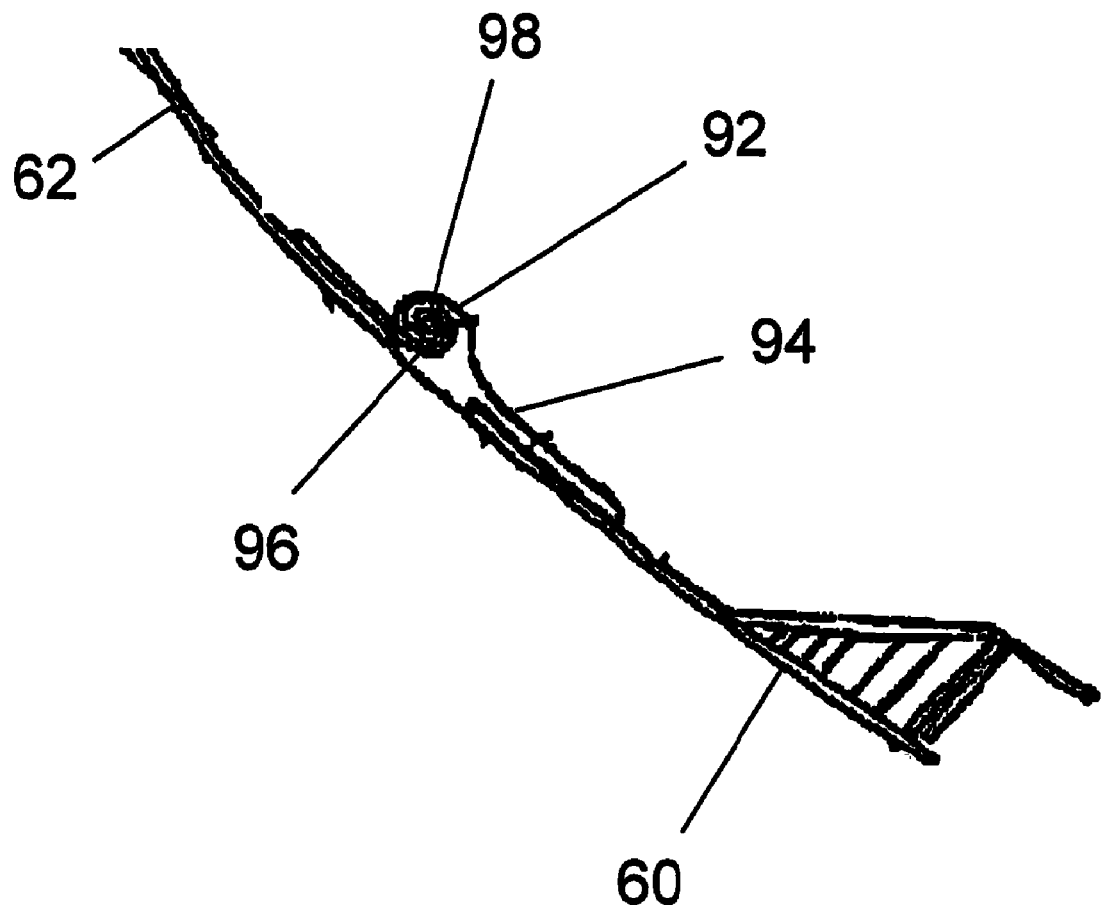
FIG. 13 is a detail cross section of a leading edge skin hinge and retaining pin.

FIGS. 11 and 12 are detail cross sections of the attachment of a shear web 72 to a rib 36. The shear web 72 has a first shear web edge 74 and an opposing second shear web edge 76. The shear web 72 also has a first shear web skin 78 and a second shear web skin 80 bonded to opposing sides of a shear web core 82.

An first connector pultrusion 84 having an H-shaped cross section is bonded to the first shear web edge 74 and to a rib 36 of the first spar pultrusion 30. A similar second connector pultrusion 86 is bonded to the second shear web edge 76 and to a rib 36 of the second spar pultrusion 32. The first and second connector pultrusions 84, 86 are manufactured from a connector reinforcing fiber and connector thermoset resin using pultrusion technology as discussed above.

The first and second connector pultrusions 84, 86 are elongated and extend the length of each shear web 72. To provide a second load path and a rip-stop in the event that a bond between the connector pultrusions 84, 86 and ribs 36 should fail, a series of holes 88 communicates through each connector pultrusion 84, 86 and the corresponding rib 36 to which the connector pultrusion 84, 86 is bonded. A pin member 90 is disposed within each hole 88, mechanically clamping the attachment between the connector pultrusions 84, 86 and the ribs 36. The plurality of pin members 90 prevents failure of a bond from spreading.

The leading edge skin 62 is shown by FIGS. 7-10 and 13. The leading edge skin 62 is rolled from stainless steel and extends from the rotor blade root 46 to the rotor blade tip 48. Releasable attachments 92 join the leading edge skin 62 to the first composite skin 58 and the second composite skin 60. From FIG. 13, the releasable attachment 92 comprises a composite skin leading edge pultrusion 94, a leading edge skin hinge 96 and a retaining pin 98. The composite skin leading edge pultrusion 94 is bonded to the leading edge side of the first and the second composite skins 58, 60. The leading edge skin hinge 96 and the composite skin leading edge pultrusion 94 are maintained in engagement by retaining pin 98. Leading edge skin 62 may be removed from engagement with the first and second composite skins 58, 60 by removing retaining pins 98, allowing inspection of the interior of the rotor blade 14 including the shear webs 72 and the first and second spar pultrusions 30, 32.

Figure 16:
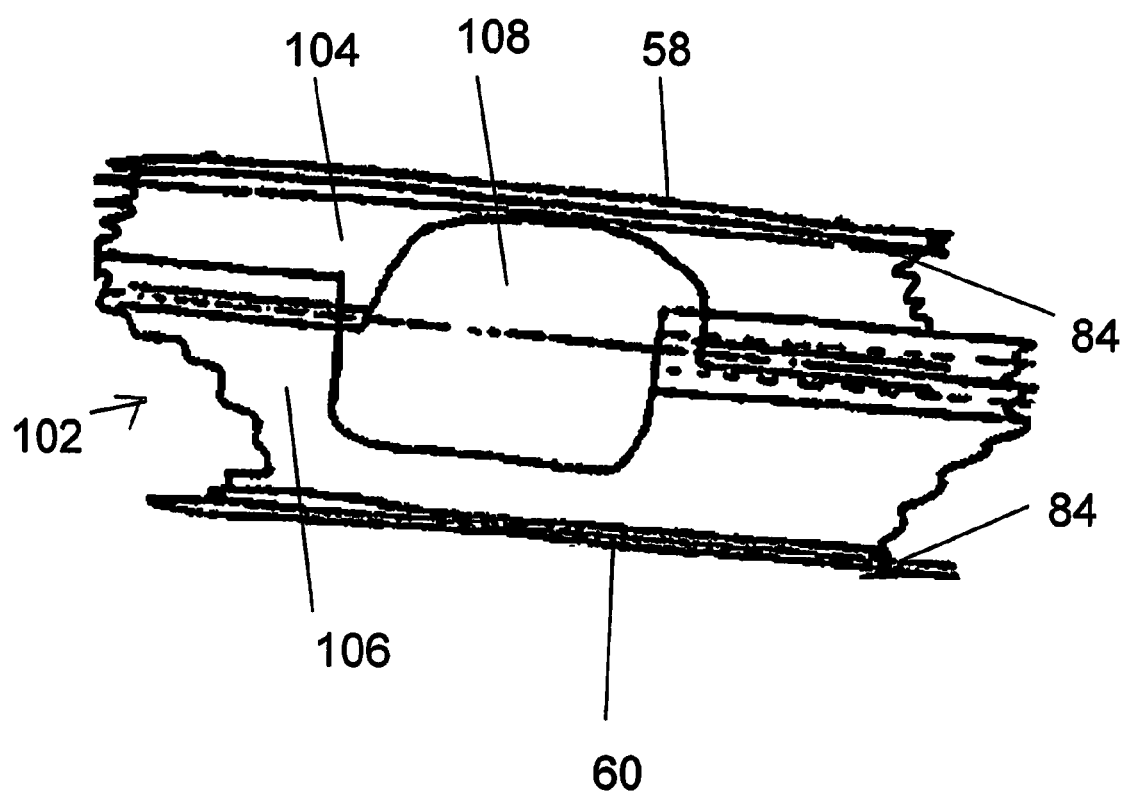
FIG. 16 is a detail cross section of a third trailing edge mechanical lock.

Trailing edge 56 is illustrated by FIGS. 14 through 16. FIGS. 14 and 15 are detail cross sections of the trailing edge 56. First and second composite skins 58, 60 each defines a trailing edge portion 100 proximal to trailing edge 56. A mechanical lock 102 defines a releasable engagement of the first and second composite skins 58, 60 at the trailing edge portion 102. The mechanical lock 102 features a male portion pultrusion 104 and a female portion pultrusion 106. The male and female portion pultrusions 104, 106 are manufactured using pultrusion technology, as described above. The male and female portion pultrusions 104, 106 are bonded to opposing inside surfaces 64 of first and second composite skins 58, 60. Male and female portion pultrusions 104, 106 releasably engage one with the other to form the releasable engagement. FIGS. 14 and 15 illustrate two different embodiments of mechanical lock 102.

FIG. 16 is cross section of the rotor blade 14 looking toward the trailing edge 56 in a direction parallel to the chord 50. Male and female portions 104, 106 of mechanical lock 102 define periodic openings 108 to facilitate selectable engagement and disengagement of male and female portions 104, 106.

Figure 17:
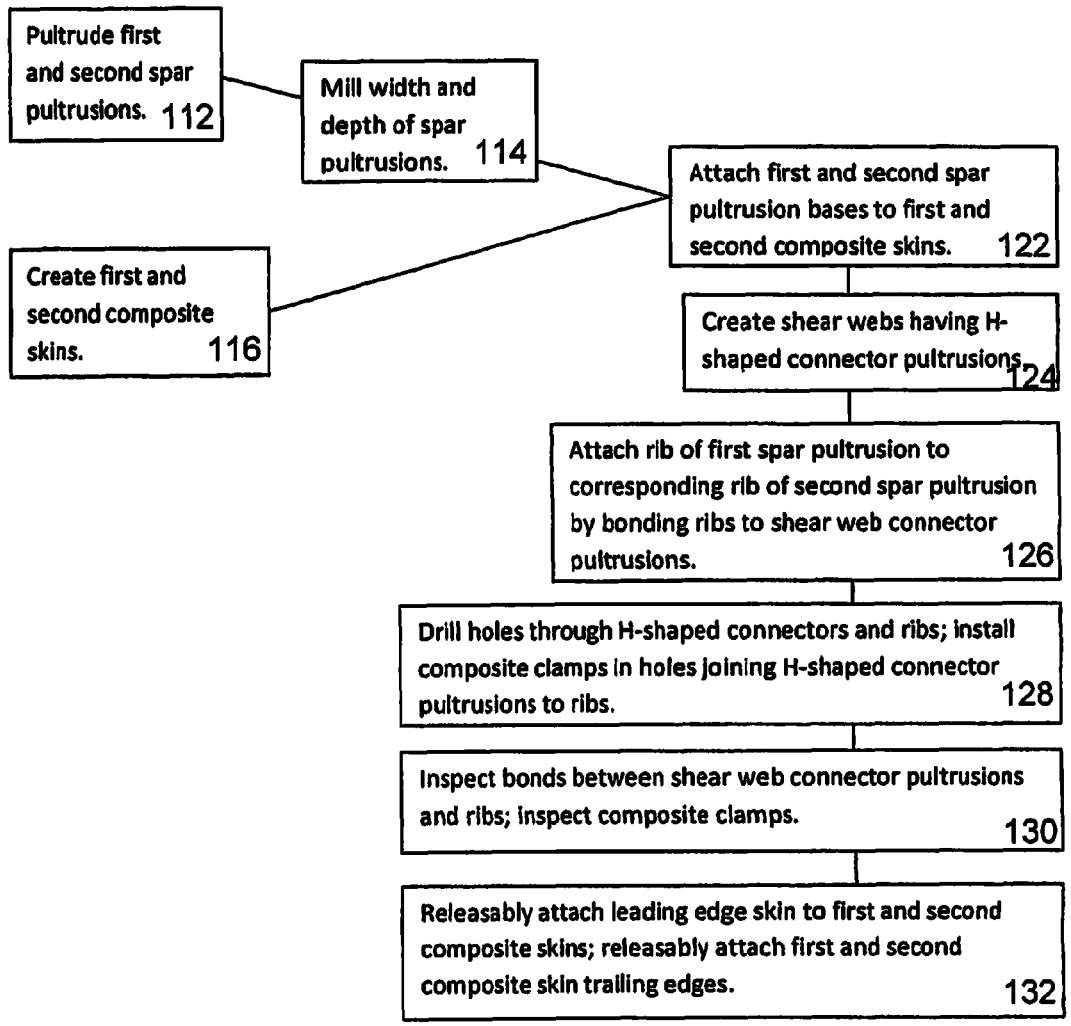
FIG. 17 is a flow chart of the method of the Invention.

FIG. 17 is a flow chart of the method of the Invention. From step 112, first and second spar pultrusions 30, 32 are manufactured using pultrusion technology. Spar pultrusion fibers 146 such as fibers of glass or carbon are wetted-out with a spar pultrusion resin 148, which is usually unsaturated polyester or a vinyl ester thermosetting resin. The wetted-out fibers are compacted to eliminate excess resin and pulled through a heated spar pultrusion die. The cross section of the spar pultrusion die is illustrated by FIG. 2, which is the cross section of both the die opening and the spar pultrusion exiting the die. As discussed above with respect to FIG. 2, the spar pultrusion has a spar pultrusion base 34 having a width 38. A plurality of ribs 36 are integral to the base 34 and extend generally normal to the base 34. The base and the ribs are elongated and have an elongated dimension 70, illustrated by FIG. 4.

For step 114, each of the first and second spar pultrusions is cut as described above relating to FIG. 4 to reduce the width 38 of each spar pultrusion and hence the number of ribs in a step-wise fashion from the spar pultrusion root end 42 to the spar pultrusion tip end 44. The first and second spar pultrusion 30, 32 also are cut to reduce the depth 40 of the ribs 36 from the root end 42 to the tip end 44.

For step 116, first and second composite skins 58, 60 are created as described above and comprise a skin resin 144 and a skin reinforcing fiber 142. Each of the first and second composite skins 58, 60 has a longitudinal dimension 118 (FIG. 6) and a leading edge portion 120.

For steps 122 through 128, the first and second composite skins 58, 60 are joined one to the other by a shear webs 72 attaching corresponding ribs 36 of the first and second spar pultrusions 30, 32. As described above relating to FIGS. 11 and 12, the shear web 72 features connector pultrusions 84, 86 attached to opposing edges 74, 76 of the shear web 72. The connector pultrusions comprise a connector pultrusion thermoset resin 150 and a connector pultrusion reinforcing fiber 152. The first connector pultrusion 84 is attached to a rib 36 of the first spar pultrusion 30 by a first connector bond 134, shown by FIG. 12. The second connector pultrusion 86 is attached to a corresponding rib 36 of the second spar pultrusion by a second connector bond 136, shown by FIG. 11. First and second connector bonds 134, 136 may be formed by any suitable bonding agent, such as a thermosetting resin.

To provide a rip-stop and a secondary load path, first and second connector pultrusions 84, 86 also are attached to ribs 36 by a plurality of holes 88 drilled through the first and second connector pultrusions 84, 86 and the ribs 36 to which those connector pultrusions 84, 86 are bonded. A pin member 90 is disposed within each hole.

Step 130 provides a step that is not possible using current technology wind turbine construction techniques. In step 130, the first connector bond 134 and the second connector bond 136 are inspected after the bonds 134, 136 are created and prior closing the composite skins 58, 60 to form the finished rotor blade 14. Any defects can be identified and corrected during construction to prevent failure of the rotor blade 14 in operation.

In step 132, the leading edge skin 62 is fabricated and releasably attached to the leading edge portion 112 of the first and second skins 58, 60, defining leading edge 54 of rotor blade 14. Trailing edge portions 100 of first and second composite skins 58, 60 are releasably joined one to the other to define trailing edge 56 of rotor blade.

Figure 18:
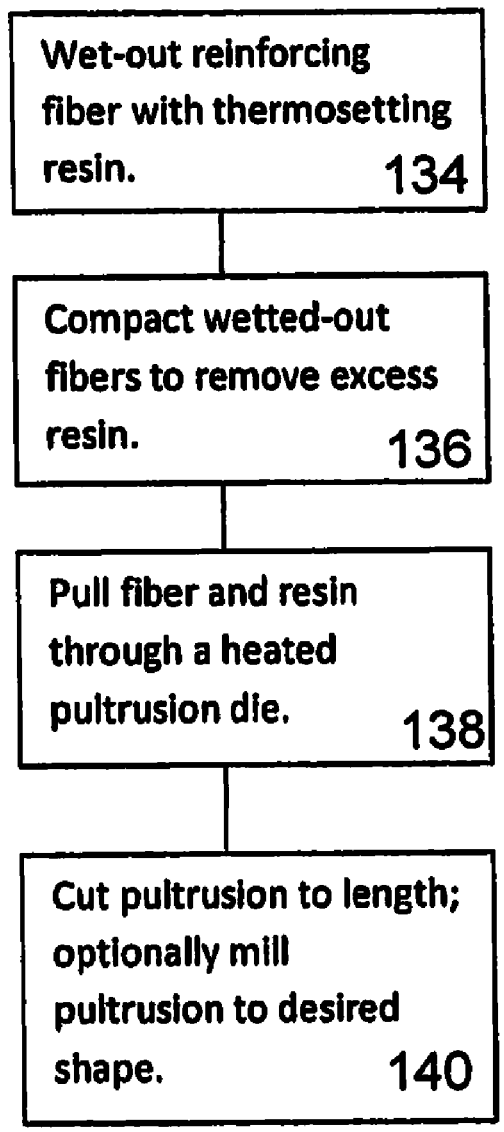
FIG. 18 is a flow chart of the pultrusion process.

FIG. 18 illustrates the steps of the continuous pultrusion process. In step 134, a reinforcing fiber is wetted-out; that is, saturated, with a thermosetting resin. The reinforcing fiber may be a spar pultrusion reinforcing fiber, a connector reinforcing fiber or a skin reinforcing fiber. The thermosetting resin may be a spar pultrusion thermoset resin, a connector pultrusion thermoset resin or a skin resin. The reinforcing fibers and thermoset resin may be any suitable fiber and suitable resin for the component to be pultruded. As indicated by steps 136-140, the wetted-out fibers are pulled through a pultrusion die and heated, curing the resin into a hardened part by the time that the fiber and resin leave the die.

Figure 19:
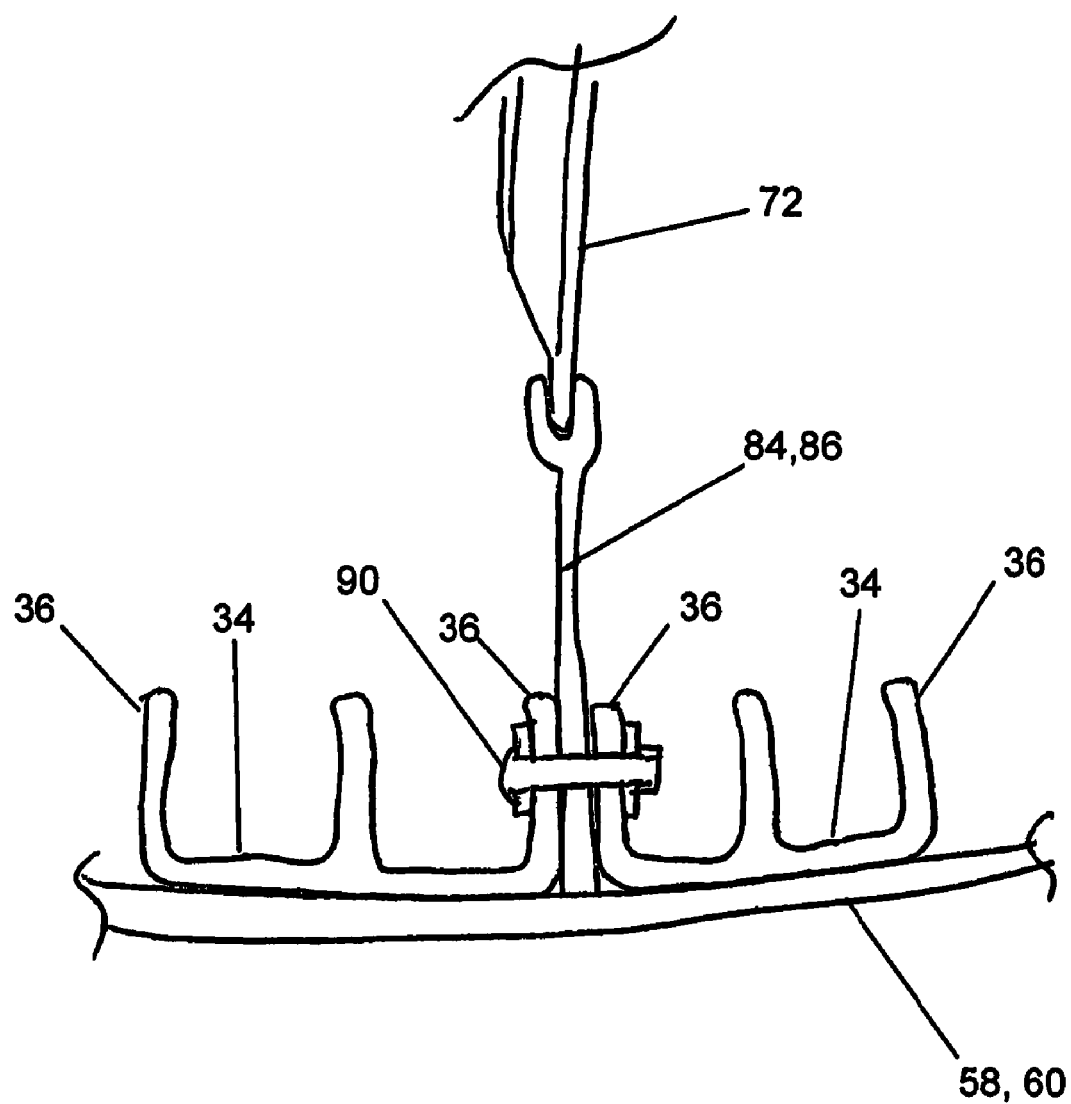
FIG. 19 is a detail cross section of an embodiment having two spar pultrusions attached to one skin.

FIG. 19 illustrates an embodiment having more than one spar pultrusion attached to one skin. As shown by FIG. 19, two spar pultrusions 30 each having a base 34 are bonded to the first skin 58 or the second skin 60. Two adjacent ribs 36 of the two spar pultrusions 30 each are bonded to a connector pultrusion 84, 86. The two adjacent ribs 36 also are connected to connector pultrusion 84, 86 by pin members 90. The connector pultrusion 84, 86 is bonded to shear web 72.

List Of Claim Elements

The following is a list of elements appearing in the Claims and the element numbers to which those elements are referred to in the Specification and in the drawings. The elements are presented generally in the order in which they appear in the Claims.

an rotor blade 14
a leading edge 54
a trailing edge 56
a rotor blade root 46
a rotor blade tip 48
a chord 50
a span 52
a first composite skin 58
a second composite skin 60
an inside surface 64
a composite skin root end 66
a composite skin tip end 68
a first spar 30
a second spar 32
a spar base 34
a plurality of elongated ribs 36
a spar root end 42
a spar tip end 44
at least one shear web 72
a first shear web edge 74
an opposing second shear web edge 76
an elongated dimension 70
a width 38
a spar reinforcing fiber 142
a spar thermoset resin 144
a depth 40
a first shear web skin 78
a second shear web skin 80
a shear web core 82
a first shear web edge 74
a second shear web edge 76
a first connector 84
a second connector 86
a connector thermoset resin 150
a connector reinforcing fiber 152
pin members 90
holes 88
a leading edge skin 62
a releasable attachment 92
A composite skin hinge 94
a leading edge skin hinge 96
a retaining pin 98
a trailing edge portion (of the first and second composite skins) 100
a releasable attachment 92
a mechanical lock 102
a male portion 104
a female portion 106
a tower 4
an electrical generator 22
a ground 28
a turbine rotor blade 14
an axis of rotation 12
a composite skin root 66
a composite skin tip 68
a skin reinforcing fiber 142
a skin resin 144
a longitudinal dimension (of skins) 110
a pultrusion die 138
an elongated dimension 70
a leading edge portion of said first skin 112
a leading edge portion of said second skin 112
Cutting each said spar to reduce said spar base width 114
cutting said ribs to reduce said depth 114
a first elongated connector bond 134
a second elongated connector bond 136
inspecting said first elongated connector bond 130
inspecting said second elongated connector bond 130
inspecting said pin members 130

I claim:

1. A wind turbine rotor blade, the rotor blade defining a leading edge, a trailing edge, a rotor blade root, a rotor blade tip, a chord and a span, the rotor blade comprising:
   a. a first composite skin and a second composite skin, each of said first and said second composite skins having an inside surface, each of said first and said second composite skins defining a composite skin root end defining said rotor blade root and a composite skin tip end defining said rotor blade tip;
   b. a first spar and a second spar, said first and said second spars being elongated, said first and said second spars each having a spar base and a plurality of elongated ribs attached to and generally normal to said base, said spar having a spar root end and a spar tip end, said base of said first spar being bonded to said inside surface of said first composite skin, said base of said second spar being bonded to said inside surface of said second composite skin, said spar root end of said first and said second spars being located proximal to said rotor blade root, said spar tip end of said first and said second spars being located proximal to said rotor blade tip;
   c. at least one shear web, said shear web having a first shear web edge and an opposing second shear web edge, said first shear web edge being attached to a rib of said first spar, said second shear web edge being attached to a rib of said second spar, at least one of said ribs not being attached to said first shear web edge or said second shear web edge at a location along said first spar or said second spar.

2. The rotor blade of claim 1 wherein said first spar and said second spar each has an elongated dimension and said base has a width normal to said elongated dimension, said width decreasing along said elongated dimension of said first and said second spars from said spar root end to said spar tip end, said plurality of ribs being in a spaced apart relation along said width, said plurality of ribs having a number, said number of said ribs decreasing in a step-wise fashion along said elongated dimension of said first and said second spar from said spar root end to said spar tip end, said first and said second spars being composed of a spar reinforcing fiber and a spar thermoset resin.

3. The rotor blade of claim 2 wherein each said rib of said first spar and said second spar each has a depth, said depth of each said rib decreasing along said elongated dimension of said first and said second spars from said root end to said tip end, said plurality of ribs and said base defining each said spar being composed of a single piece.

4. The rotor blade of claim 2 wherein said shear web comprises a one of a plurality of said shear webs, each said shear web having said first shear web and said second shear web edge, each said first shear web edge of each said shear web being attached to a one of said ribs of said first spar, each said second shear web edge of each said shear web being attached to a one of said ribs of said second spar.

5. The rotor blade of claim 2 wherein said turbine rotor blade further comprising: a leading edge skin, said leading edge skin extending from said rotor blade root to said rotor blade tip, said leading edge skin defining said leading edge, said leading edge skin having a hinged attachment to a one of said first skin and said second skin.

6. The rotor blade of claim 2 wherein said first composite skin and said second composite skin each defines a trailing edge portion, said trailing edge portions of said first and said second composite skins having a releasable attachment joining one of said first and said second composite skins to the other to define said turbine rotor blade trailing edge, said releasable attachment being proximal to said trailing edge.

7. The rotor blade of claim 2 wherein said first spar comprises: a plurality of said first spars, each of said plurality of first spars having said base and having said plurality of ribs attached to said base, each said base of said plurality of said first spars being bonded to said first inside surface of said first skin such that one said rib of a one of said plurality of first spars is adjacent to another said rib of another of said plurality of first spars, said first shear web edge being attached to said one said rib and to said adjacent another said rib.

8. The rotor blade of claim 7 wherein said second spar comprises: a plurality of said second spars, each of said plurality of second spars having said base and having said plurality of ribs attached to said base, each said base of said plurality of said second spars being bonded to said second inside surface of said second skin such that one said rib of a one of said plurality of second spars is adjacent to another said rib of another of said plurality of second spars, said second shear web edge being attached to said one said rib of said one of said second spars and to said adjacent another said rib of said another of said second spars.

9. A wind turbine rotor blade, the rotor blade defining a leading edge, a trailing edge, a rotor blade root, a rotor blade tip, a chord and a span, the rotor blade comprising:
   a. a first composite skin and a second composite skin, each of said first and said second composite skins having an inside surface, each of said first and said second composite skins defining a composite skin root end defining said rotor blade root and a composite skin tip end defining said rotor blade tip;
   b. a first spar and a second spar, said first and said second spars being elongated, said first and said second spars each having a spar base and a plurality of elongated ribs attached to and generally normal to said base, said spar having a spar root end and a spar tip end, said base of said first spar being bonded to said inside surface of said first composite skin, said base of said second spar being bonded to said inside surface of said second composite skin, said spar root end of said first and said second spars being located proximal to said rotor blade root, said spar tip end of said first and said second spars being located proximal to said rotor blade tip;
   c. at least one shear web, said shear web each having a first shear web edge and an opposing second shear web edge, said first shear web edge being attached to a one of said ribs of said first spar, said second shear web edge being attached to a one of said ribs of said second spar, wherein said first spar and said second spar each has an elongated dimension and said base has a width normal to said elongated dimension, said width decreasing in a stepwise fashion along said elongated dimension of said first and said second spar from said spar root end to said spar tip end, said first and said second spars being composed of a spar reinforcing fiber and a spar thermoset resin, said shear web comprising:
   d. a first shear web skin;
   e. a second shear web skin;
   f. a shear web core, said first and said second shear web skins being strong compared to said shear web core, said first and said second shear web skins being attached to opposing sides of said shear web core, said shear web having a first shear web edge and a second shear web edge;
   g. a first connector and a second connector, said first and said second connectors comprising a connector thermoset resin and a connector reinforcing fiber, said first connector being bonded to a one of said first and said second shear web edges and to a one of said ribs of said first spar, said second connector being bonded to the other of said first and said second shear web edges and to one of said ribs of said second spar;
   h. a plurality of pin members, a plurality of holes being defined by first and said second connectors and said ribs to which said first and said second connectors are bonded, each of said pin members being disposed within a one of said holes.

10. A wind turbine rotor blade, the rotor blade defining a leading edge, a trailing edge, a rotor blade root, a rotor blade tip, a chord and a span, the rotor blade comprising:
   a. a first composite skin and a second composite skin, each of said first and said second composite skins having an inside surface, each of said first and said second composite skins defining a composite skin root end defining said rotor blade root and a composite skin tip end defining said rotor blade tip;
   b. a first spar and a second spar, said first and said second spars being elongated, said first and said second spars each having a spar base and a plurality of elongated ribs attached to and generally normal to said base, said spar having a spar root end and a spar tip end, said base of said first spar being bonded to said inside surface of said first composite skin, said base of said second spar being bonded to said inside surface of said second composite skin, said spar root end of said first and said second spars being located proximal to said rotor blade root, said spar tip end of said first and said second spars being located proximal to said rotor blade tip;
   c. at least one shear web, said shear web each having a first shear web edge and an opposing second shear web edge, said first shear web edge being attached to a one of said ribs of said first spar, said second shear web edge being attached to a one of said ribs of said second spar, wherein said first spar and said second spar each has an elongated dimension and said base has a width normal to said elongated dimension, said width decreasing in a stepwise fashion along said elongated dimension of said first and said second spar from said spar root end to said spar tip end, said first and said second spars being composed of a spar reinforcing fiber and a spar thermoset resin,
   d. a leading edge skin, said leading edge skin extending from said rotor blade root to said rotor blade tip, said leading edge skin defining said leading edge, said leading edge skin having a releasable attachment to each of said first skin and to said second skin wherein said releasable attachment between said leading edge skin and said first and said second composite skins comprising:
   e. a composite skin hinge, said composite skin hinge being bonded to said first composite skin or said second composite skin; and
   f. a leading edge skin hinge, said leading edge skin hinge being attached to said leading edge skin, said leading edge skin hinge matably engaging said composite skin hinge; and
   g. a retaining pin, said retaining pin engaging said composite skin hinge and said leading edge skin hinge, said retaining pin holding said leading edge skin hinge and said composite hinge in engagement.

11. A wind turbine rotor blade, the rotor blade defining a leading edge, a trailing edge, a rotor blade root, a rotor blade tip, a chord and a span, the rotor blade comprising:
   a. a first composite skin and a second composite skin, each of said first and said second composite skins having an inside surface, each of said first and said second composite skins defining a composite skin root end defining said rotor blade root and a composite skin tip end defining said rotor blade tip;
   b. a first spar and a second spar, said first and said second spars being elongated, said first and said second spars each having a spar base and a plurality of elongated ribs attached to and generally normal to said base, said spar having a spar root end and a spar tip end, said base of said first spar being bonded to said inside surface of said first composite skin, said base of said second spar being bonded to said inside surface of said second composite skin, said spar root end of said first and said second spars being located proximal to said rotor blade root, said spar tip end of said first and said second spars being located proximal to said rotor blade tip;
   c. at least one shear web, said shear web each having a first shear web edge and an opposing second shear web edge, said first shear web edge being attached to a one of said ribs of said first spar, said second shear web edge being attached to a one of said ribs of said second spar, wherein said first spar and said second spar each has an elongated dimension and said base has a width normal to said elongated dimension, said width decreasing in a step-wise fashion along said elongated dimension of said first and said second spar from said spar root end to said spar tip end, said first and said second spars being composed of a spar reinforcing fiber and a spar thermoset resin,
   wherein said first composite skin and said second composite skin each defines a trailing edge portion, said trailing edge portions of said first and said second composite skins having a releasable attachment joining one of said first and said second composite skins to the other to define said turbine rotor blade trailing edge, wherein said releasable attachment of said trailing edge portions further comprises: a mechanical lock, said mechanical lock having a male portion and a female portion, said male portion being bonded to a one of said first and said second composite skins, said female portion being bonded to the other of said first and said second composite skins, said male portion being releasably retained by said female portion.

12. A wind turbine, the wind turbine comprising:
   a. a tower;
   b. an electrical generator, said electrical generator being supported above a ground by said tower;
   c. a rotor blade, said rotor blade having an axis of rotation, said tower supporting said rotor blade above said ground, said rotor blade being operably connected to said electrical generator, said rotor blade defining a leading edge, a trailing edge, a rotor blade root, a rotor blade tip, a chord and a span, said rotor blade further comprising:
      i. a first composite skin and a second composite skin, each of said first and said second composite skins having a composite skin root end defining said rotor blade root and a composite skin tip end defining said rotor blade tip;
      ii. a first spar and a second spar, said first and said second spars being elongated, each of said first and said second spars having a spar base and a plurality of elongated ribs attached to and generally normal to said spar base, each of said first and said second spars having a spar root end and a spar tip end, said first spar being bonded to said inside surface of said first composite skin, said second spar being bonded to said inside surface of said second composite skin, said spar root end of said first and said second spars being located proximal to said rotor blade root, said spar tip end of said first and said second spars being located proximal to said rotor blade tip;
      iii. at least one shear web, said shear web having a first shear web edge and an opposing second shear web edge, said first shear web edge being attached to a one of said ribs of said first spar, said second shear web edge being attached to a one of said ribs of said second spar, at least a one of said ribs not being attached to said first shear web edge or said second shear web edge at a location along said first spar or said second spar.

13. The wind turbine of claim 12 wherein said first spar and said second spar each has an elongated dimension and said spar base has a width normal to said elongated dimension, said width decreasing along said elongated dimension of said first and said second spars from said spar root end to said spar tip end, said plurality of ribs being in a spaced apart relation along said width, said plurality of ribs having a number, said number of said ribs decreasing in a step-wise fashion along said elongated dimension of said first and said second spars from said spar root end to said spar tip end, said first and said second spars being composed of a spar reinforcing fiber and a spar thermoset resin.

14. The wind turbine of claim 13 wherein each said rib of said first spar and said second spar each has a depth, said depth of each said rib decreasing along said elongated dimension of said first and said second spars from said root end to said tip end, said plurality of ribs and said base defining each said spar being of a single piece.

15. The wind turbine of claim 14 wherein said rotor blade further comprising: a leading edge skin, said leading edge skin extending from said rotor blade root to said rotor blade tip, said leading edge skin defining said leading edge, said leading edge skin having a releasable attachment to each of said first skin and to said second skin.

16. A wind turbine, the wind turbine comprising:
   a. a tower;
   b. an electrical generator, said electrical generator being supported above a ground by said tower;
   c. a rotor blade, said rotor blade having an axis of rotation, said tower supporting said rotor blade above said ground, said rotor blade being operably connected to said electrical generator, said rotor blade defining a leading edge, a trailing edge, a rotor blade root, a rotor blade tip, a chord and a span, said rotor blade further comprising:
      i. a first composite skin and a second composite skin, each of said first and said second composite skins having a composite skin root end defining said rotor blade root and a composite skin tip end defining said rotor blade tip;
      ii. a first spar and a second spar, said first and said second spars being elongated, each said first and said second spar having a spar base and a plurality of elongated ribs attached to and generally normal to said spar base, each said first and said second spar having a spar root end and a spar tip end, said first spar being bonded to said inside surface of said first composite skin, said second spar being bonded to said inside surface of said second composite skin, said spar root end of said first and said second spar being located proximal to said rotor blade root, said spar tip end of said first and said second spars being located proximal to said rotor blade tip;

iii. at least one shear web, said shear web each having a first shear web edge and an opposing second shear web edge, said first shear web edge being attached to a one of said ribs of said first spar, said second shear web edge being attached to a one of said ribs of said second spar, wherein said first spar and said second spar each has an elongated dimension and said base has a width normal to said elongated dimension, said width decreasing in a step-wise fashion along said elongated dimension of said first and said second spars from said spar root end to said spar tip end, said first and said second spars being composed of a spar reinforcing fiber and a spar thermoset resin, each said rib of said first spar and said second spar has a depth, said depth of each said rib decreasing along said elongated dimension of said first and said second spars from said root end to said tip end wherein said shear web comprises:

iv. a first shear web skin;

v. a second shear web skin;

vi. a shear web core, said first and said second shear web skins being strong compared to said shear web core, said first and said second shear web skins being attached to opposing sides of said shear web core, said shear web having a first shear web edge and a second shear web edge;

vii. a first connector and a second connector, said first and said second connectors comprising a connector thermoset resin and a connector reinforcing fiber, said first connectors being bonded to a one of said first and said second shear web edges and to one said rib of said first spar, said second connector being bonded to the other of said first and said second shear web edges and to one said rib of said second spar;

viii. a plurality of pin members, a plurality of holes being defined by first and said second connectors and said ribs to which said first and said second connectors are bonded, each of said pin members being disposed within a one of said holes.

17. The wind turbine of claim 16 wherein said first composite skin and said second composite skin each defines a trailing edge portion, said trailing edge portions of said first and said second composite skins having a releasable attachment joining one of said first and said second composite skins to the other to define said rotor blade trailing edge.

18. The wind turbine of claim 17 wherein said releasable attachment of said trailing edge portions further comprises: a mechanical lock, said mechanical lock having a male portion and a female portion, said male portion being bonded to a one of said first and said second composite skins, said female portion being bonded to the other of said first and said second composite skins, said male portion being releasably retained by said female portion.

19. A wind turbine, the wind turbine comprising:
a. a tower;
b. an electrical generator, said electrical generator being supported above a ground by said tower;
c. a rotor blade, said rotor blade having an axis of rotation, said tower supporting said rotor blade above said ground, said rotor blade being operably connected to said electrical generator, said rotor blade defining a leading edge, a trailing edge, a rotor blade root, a rotor blade tip, a chord and a span, said rotor blade further comprising:

i. a first composite skin and a second composite skin, each of said first and said second composite skins having a composite skin root end defining said rotor blade root and a composite skin tip end defining said rotor blade tip;

ii. a first spar and a second spar, said first and said second spars being elongated, each said first and said second spar having a spar base and a plurality of elongated ribs attached to and generally normal to said spar base, each said first and said second spar having a spar root end and a spar tip end, said first spar being bonded to said inside surface of said first composite skin, said second spar being bonded to said inside surface of said second composite skin, said spar root end of said first and said second spars being located proximal to said rotor blade root, said spar tip end of said first and said second spars being located proximal to said rotor blade tip;

iii. at least one shear web, said shear web each having a first shear web edge and an opposing second shear web edge, said first shear web edge being attached to a one of said ribs of said first spar, said second shear web edge being attached to a one of said ribs of said second spar, wherein said first spar and said second spar each has an elongated dimension and said base has a width normal to said elongated dimension, said width decreasing in a step-wise fashion along said elongated dimension of said first and said second spars from said spar root end to said spar tip end, said first and said second spars being composed of a spar reinforcing fiber and a spar thermoset resin, each said rib of said first spar and said second spar has a depth, said depth of each said rib decreasing along said elongated dimension of said first and said second spars from said root end to said tip end;

iv. a leading edge skin, said leading edge skin extending from said rotor blade root to said rotor blade tip, said leading edge skin defining said leading edge, said leading edge skin having a releasable attachment to each of said first skin and to said second skin, said releasable attachment between said leading edge skin and said first and said second composite skins comprising:

v. a composite skin hinge, said composite skin hinge extending said span of the rotor blade, said composite skin hinge being bonded to said first composite skin or said second composite skin; and vi. a leading edge skin hinge, said leading edge skin hinge being attached to said leading edge skin, said leading edge skin hinge matably engaging said composite skin hinge; and vii. a retaining pin, said retaining pin engaging said composite skin hinge and said leading edge skin hinge, said retaining pin holding said leading edge skin hinge and said composite skin hinge in engagement.

20. A method for making a rotor blade for a wind turbine, the rotor blade having a rotor blade root and a rotor blade tip, the method comprising:

a. creating a first and a second composite skin, said first and second composite skins comprising a skin reinforcing fiber and a skin resin, each of said first and second composite skins having an inside surface, each of said first and said second composite skins defining a leading edge portion and a trailing edge portion, each of said first and said second composite skins having a longitudinal dimension extending from the rotor blade root to the rotor blade tip;

b. pultruding a first spar and a second spar by pulling a mixture of a spar thermoset resin and a spar fiber through a pultrusion die, said pultrusion die being configured so that each said spar defines a spar base and a plurality of elongated ribs integral to and generally normal to said spar base, each of said spar bases of said first and said second spars being elongated and having an elongated dimension, each of said ribs extending in said elongated dimension;

c. attaching said spar base of a one of said spars and said inside surface of said first rotor blade skin, said elongated dimension of said one of said spars being parallel to said longitudinal dimension of said first rotor blade skin;

d. attaching said spar base of the other of said spars and said inside surface of said second rotor blade skin, said elongated dimension of said other of said spars being parallel to said longitudinal dimension of said second rotor blade skin;

e. attaching at least one of said ribs of said first spar to a corresponding one of said ribs of said second spar at least one of said ribs of said first spar not being attached to a one of said ribs of said second spar at a location along said first spar or said second spar;

f. releasably attaching said trailing edge portions of said first and said second rotor blade skins one to the other.

* * * * *